Figure 1:
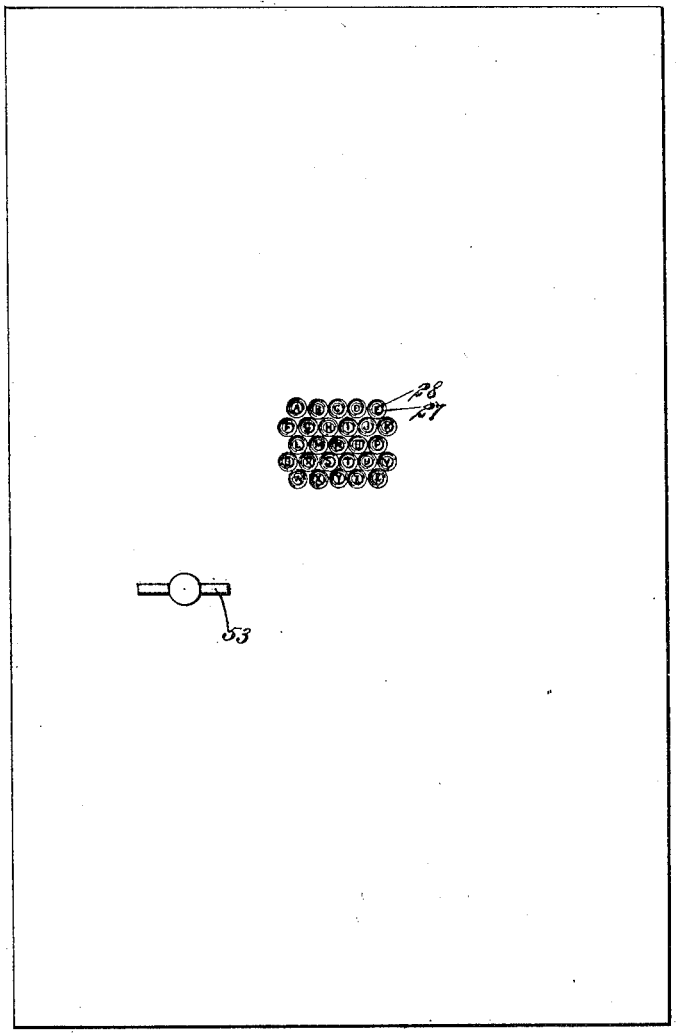

No. 706,152. Patented Aug. 5, 1902.
W. BEEBE.
PERMUTATION LOCK.
(Application filed Aug. 29, 1899. Renewed Dec. 27, 1901.)

(No Model.) 10 Sheets—Sheet 1.

WITNESSES: William P. Gaebel. Isaac R. Owens.

INVENTOR William Beebe
BY
ATTORNEYS

THE NORRIS PETERS CO., PHOTO-LITHO., WASHINGTON, D. C.

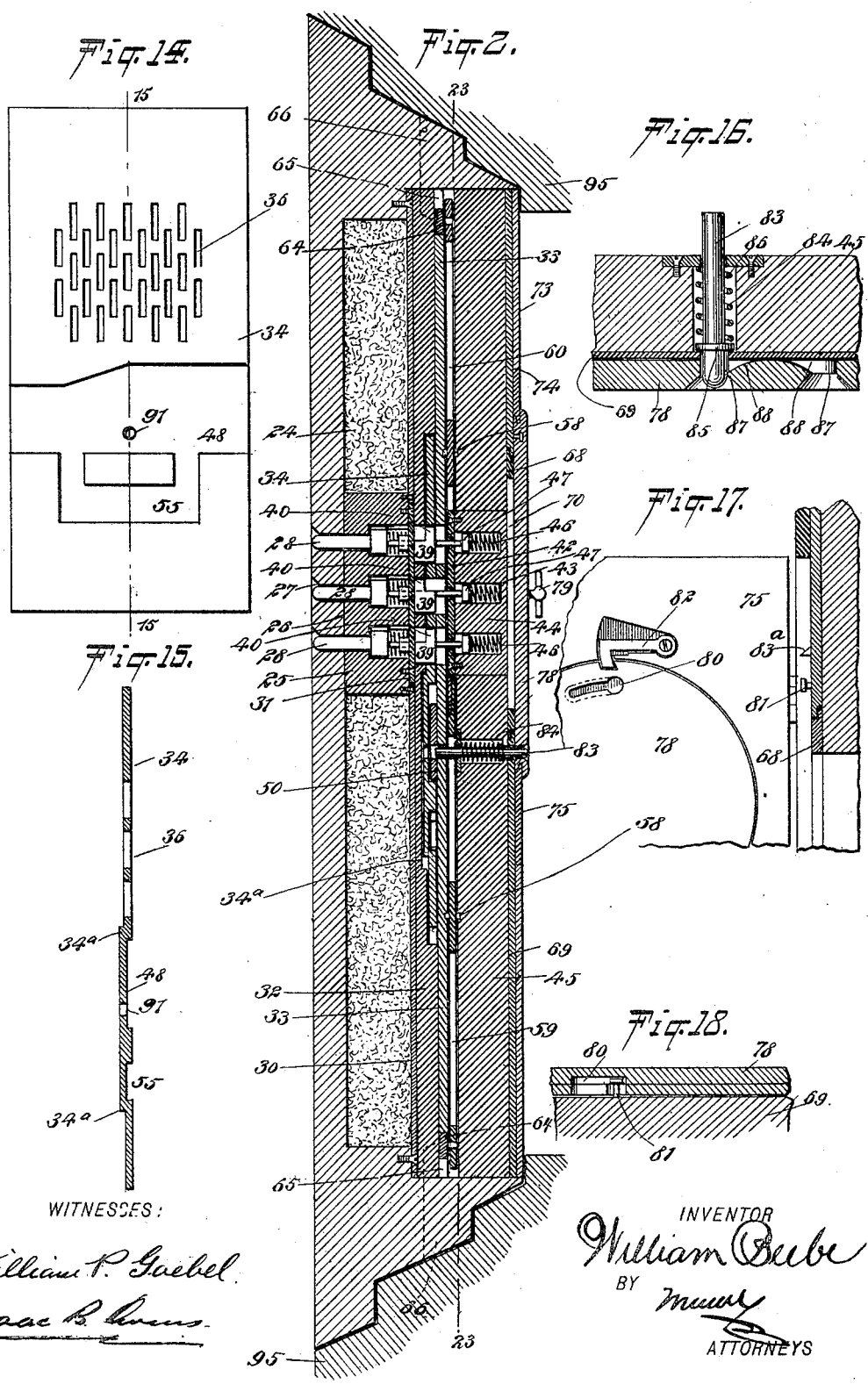

No. 706,152. Patented Aug. 5, 1902.
W. BEEBE.
PERMUTATION LOCK.
(Application filed Aug. 29, 1899. Renewed Dec. 27, 1901.)
(No Model.) 10 Sheets—Sheet 3.
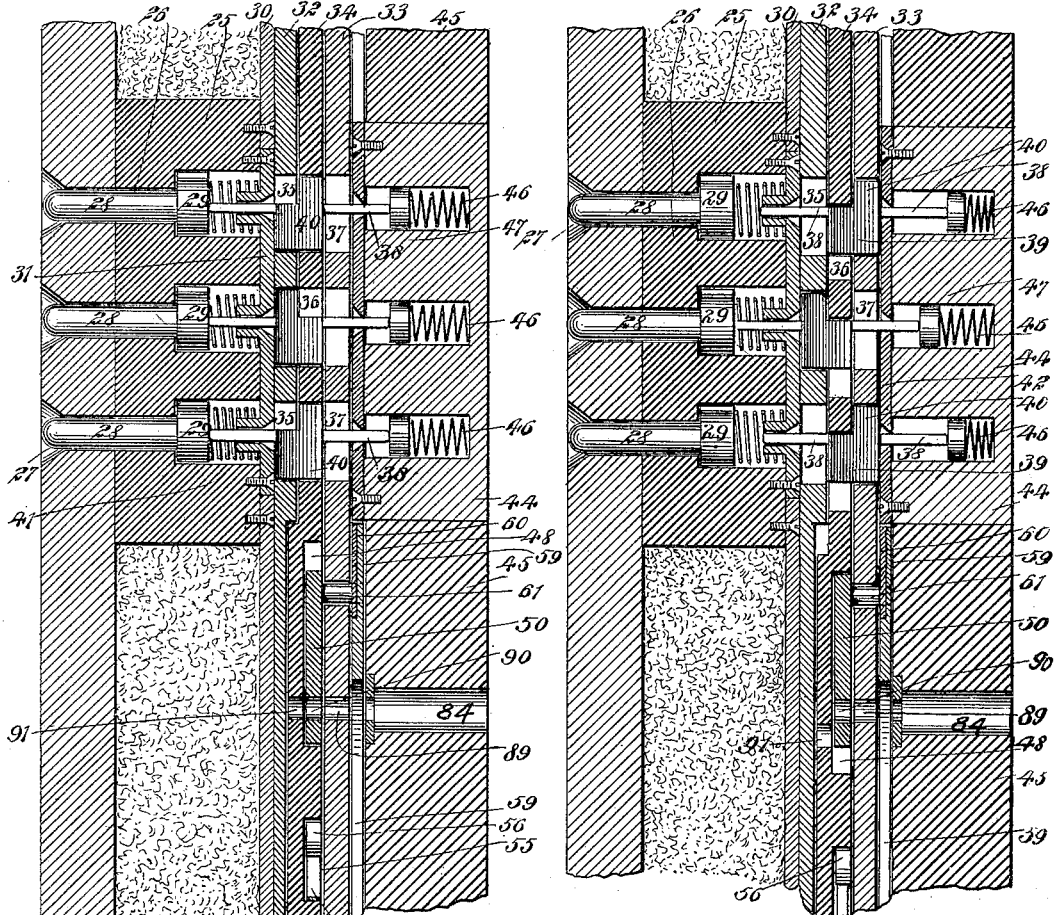
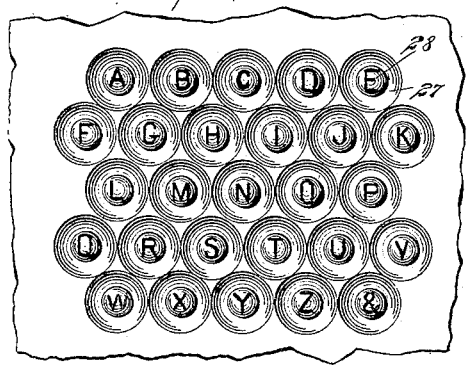
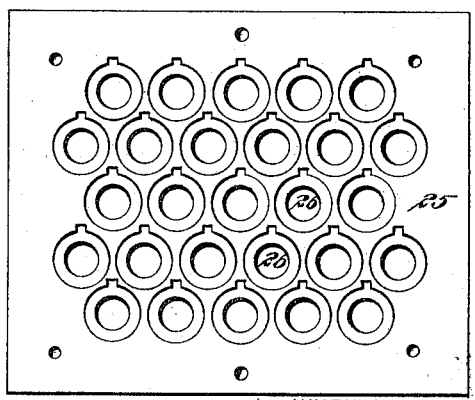
WITNESSES: INVENTOR
William P. Goebel William Beebe
Isaac B. Owens BY
ATTORNEYS

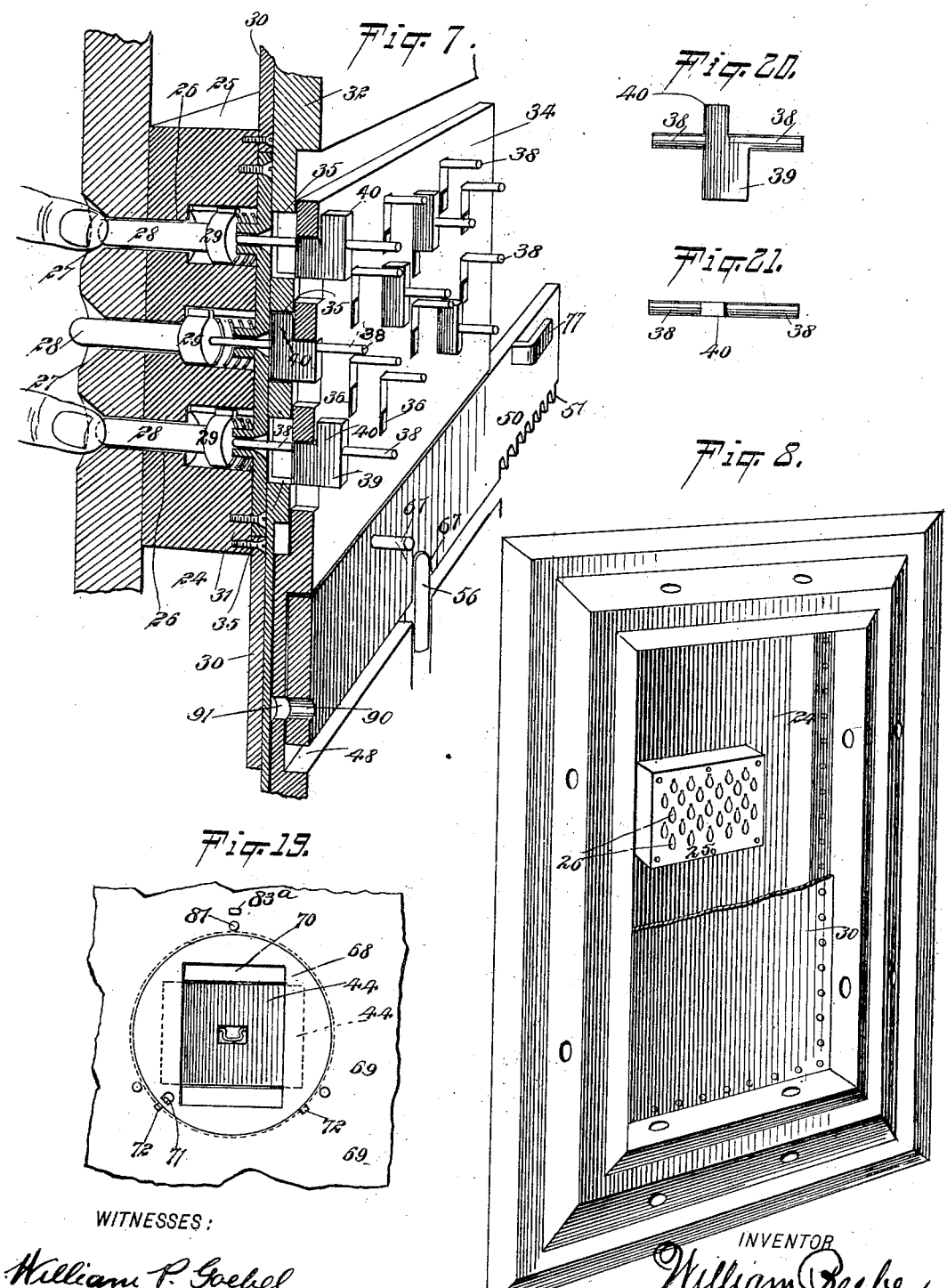

No. 706,152. Patented Aug. 5, 1902.
W. BEEBE.
PERMUTATION LOCK.
(Application filed Aug. 29, 1899. Renewed Dec. 27, 1901.)

(No Model.) 10 Sheets—Sheet 5.

WITNESSES:
William P. Goebel
[signature]

INVENTOR
William Beebe
BY
[signature]
ATTORNEYS

No. 706,152. Patented Aug. 5, 1902.
W. BEEBE.
PERMUTATION LOCK.
(Application filed Aug. 29, 1899. Renewed Dec. 27, 1901.)
(No Model.) 10 Sheets—Sheet 6.
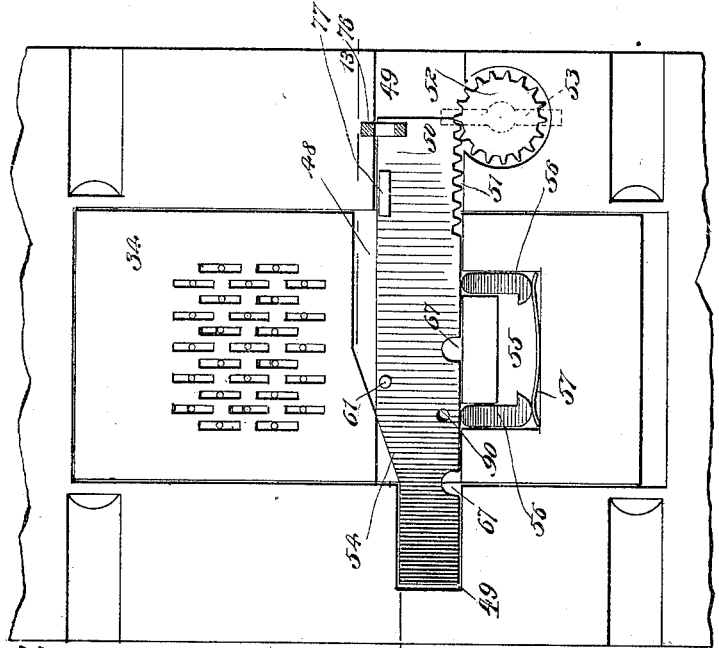
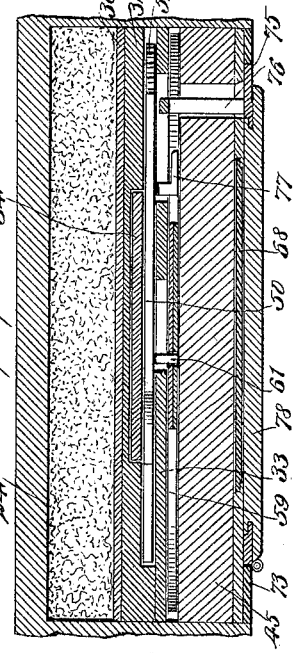
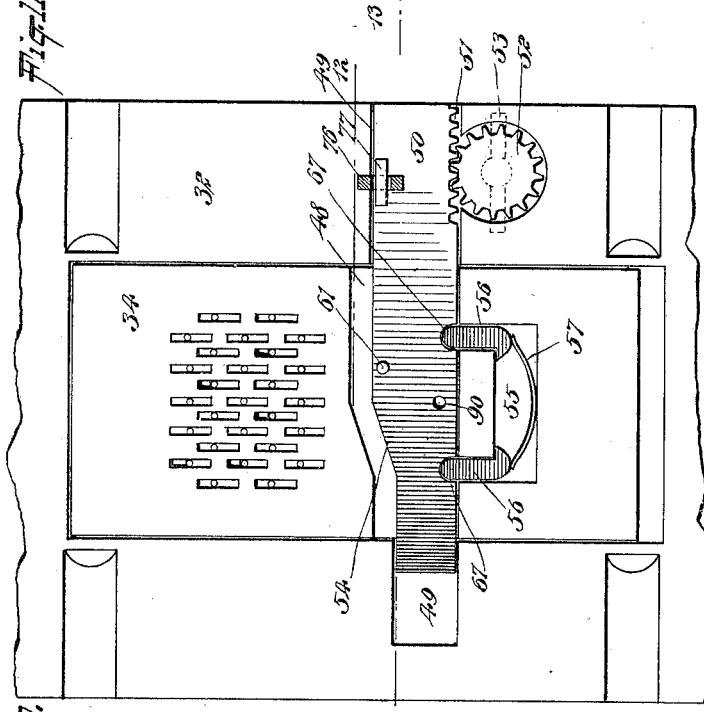
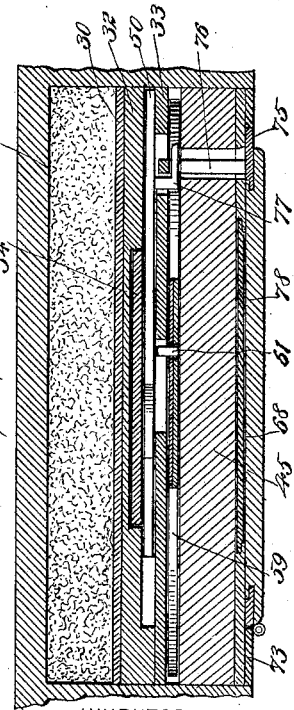
WITNESSES:
William P. Goebel.
Isaac R. Owens.
INVENTOR
William Beebe
BY
ATTORNEYS

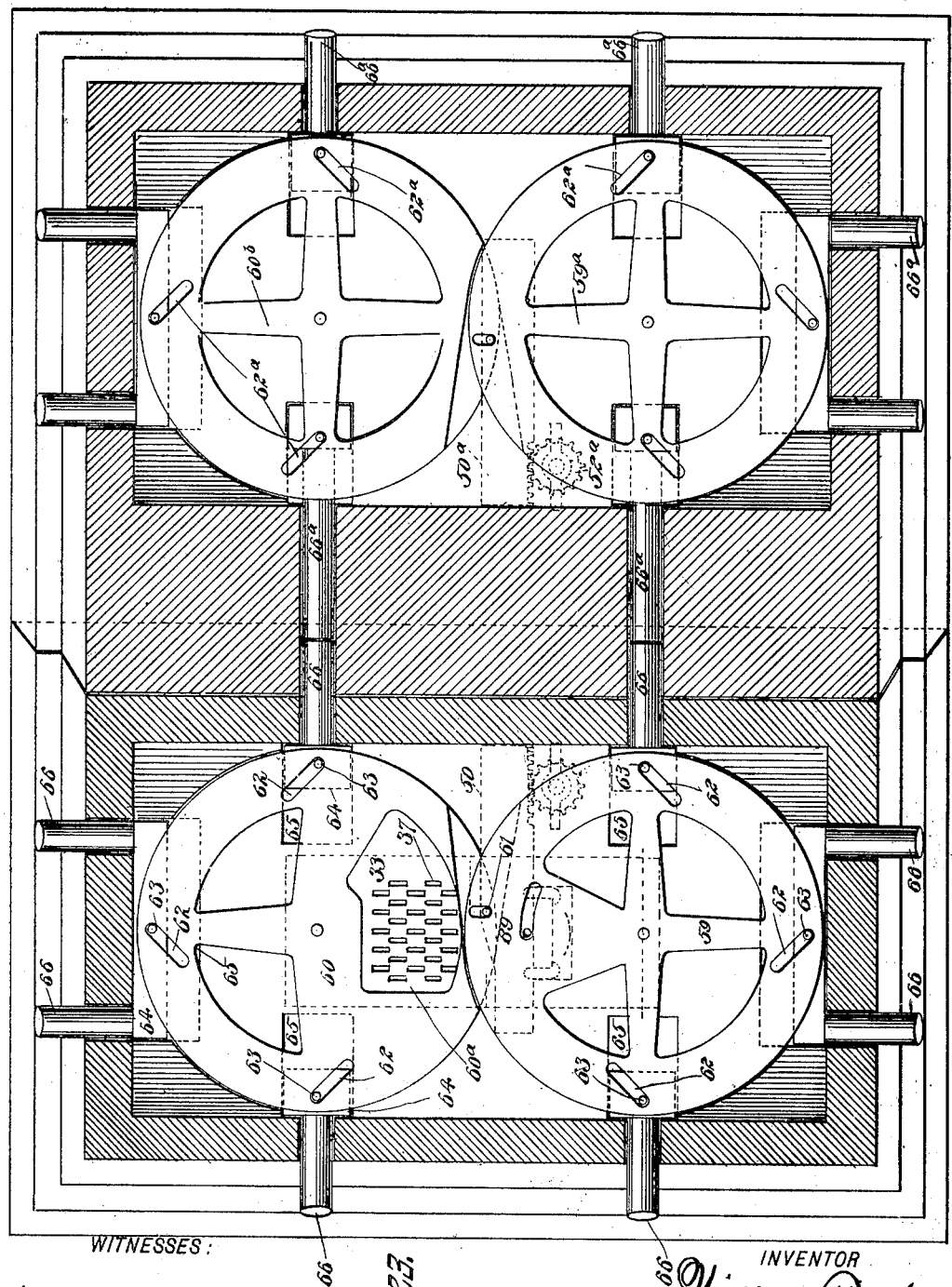

No. 706,152. Patented Aug. 5, 1902.
W. BEEBE.
PERMUTATION LOCK.
(Application filed Aug. 29, 1899. Renewed Dec. 27, 1901.)
(No Model.) 10 Sheets—Sheet 8.
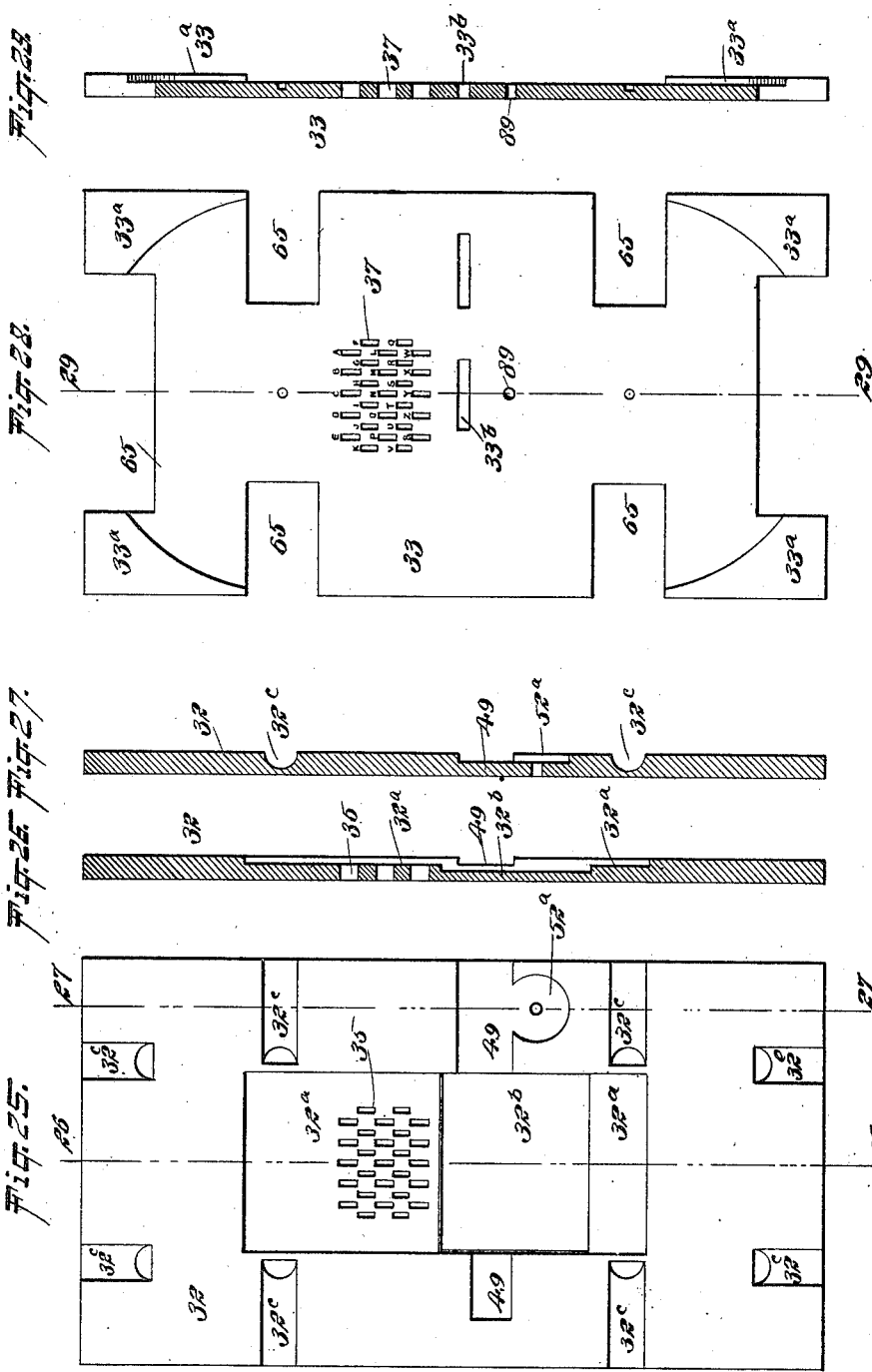

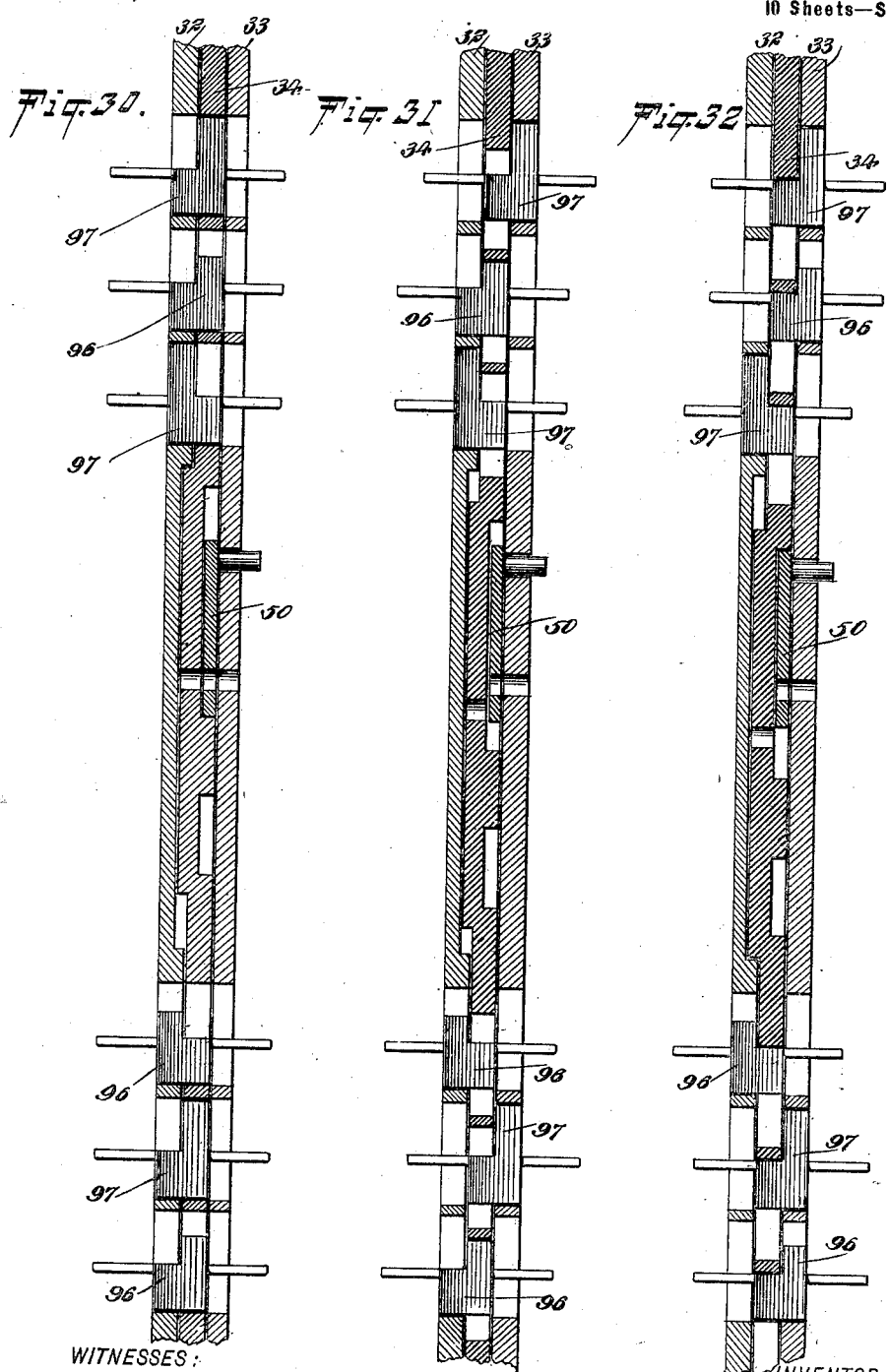

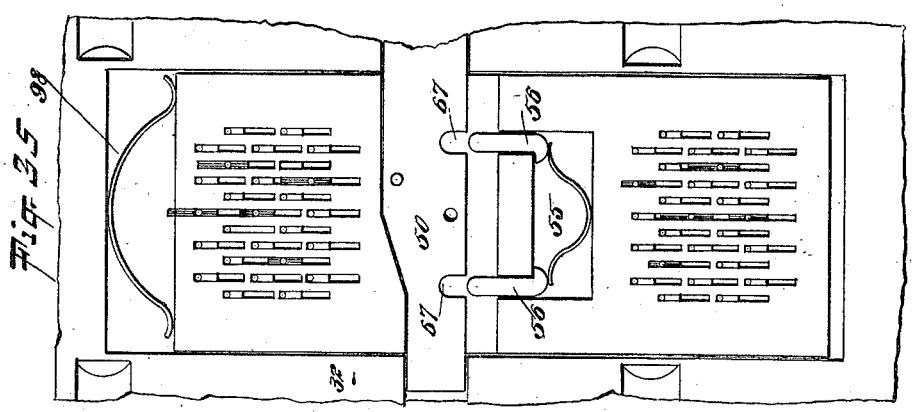

United States Patent Office.

WILLIAM BEEBE, OF BROOKLYN, NEW YORK, ASSIGNOR OF TWENTY-ONE THIRTIETHS TO JAMES M. DOREMUS, OF BROOKLYN, NEW YORK.

PERMUTATION-LOCK.

SPECIFICATION forming part of Letters Patent No. 706,152, dated August 5, 1902.

Application filed August 29, 1899. Renewed December 27, 1901. Serial No. 87,437. (No model.)

*To all whom it may concern:*

Be it known that I, WILLIAM BEEBE, of the city of New York, borough of Brooklyn, in the county of Kings and State of New York, have invented a new and Improved Permutation-Lock, of which the following is a full, clear, and exact description.

This invention relates to a permutation-lock of that class in which finger-keys are provided for operating the lock, the invention being arranged with such keys in connection with tumblers, the tumblers supporting a lock-plate which controls the bolt devices.

The object of my invention is, first, to provide a permutation-lock which is simple and consequently inexpensive in construction and at the same time possessing all the qualities necessary to adapt it for use in every case where the greatest security is desired; second, to provide a lock which cannot be "picked" or "forced" by any of the various schemes employed by burglars; third, to reduce the time required in operating combination-locks; fourth, to provide a lock which may be easily operated even in the dark, if necessary; fifth, to provide a "combination" which is easily remembered, and, sixth, to simplify the method of changing the combination and to render the same impossible by unauthorized persons.

The novel construction of my device is such that it is impossible to obtain a clue to the combination by the sense of hearing, as no change of position in any of the parts of the lock can take place (hence no sound is produced) unless the entire combination is simultaneously operated, and as the pressure required to depress the finger-keys which operate the combination-tumblers is the same as that required for the other finger-keys it will be readily understood that there can be no clue obtained by the sense of touch, and should an attempt be made to force the lock by driving in the finger-keys it would but serve to make the lock more secure, and as there is practically no limit to the number of possible combinations which may be employed in connection with my device it would be the veriest folly to attempt to try them all. Therefore the only way in which a burglar could open a safe secured with my device would be to completely wreck the door with an explosive.

In operating the combinations of the locks which are used so extensively at present a certain length of time is required, which might seem insignificant at the moment, but in the course of a year would aggregate several hours, if not days, and in instances where the operator's eyesight is impaired or his nerves unsteady the operation is rendered very difficult, and perhaps even impossible; but with my invention such objectionable features are overcome, as the lock may be operated almost instantly and even in the dark by any one knowing the combination.

To prevent tampering with the lock or combination by evil-disposed persons while the safe-door is temporarily open, I provide an arrangement whereby it is necessary to first throw the bolts into a locked position and again into an unlocked position (which of course necessitates a knowledge of the existing combination) before access can be had to the parts of the lock necessary to change the combination thereof, and when such parts are exposed the operation of changing the combination requires simply a withdrawal and reversal of the tumblers, as is hereinafter explained, and the tumblers of the combination being indicated by letters, which may be formed into words or initials or even short sentences, admits of the combination being easily committed to memory.

This specification is the disclosure of several forms of my invention, while the claims define the actual scope thereof.

Reference is to be had to the accompanying drawings, forming a part of this specification, in which similar characters of reference indicate corresponding parts in all the views.

Figure 24:
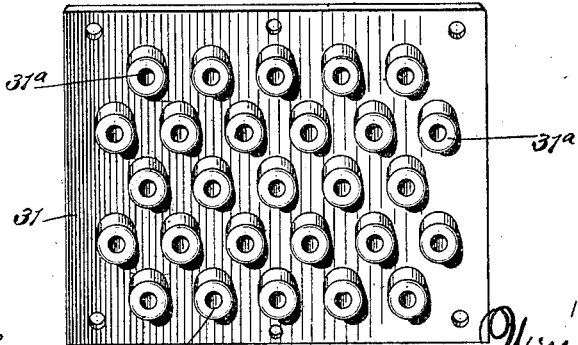
Figure 9:
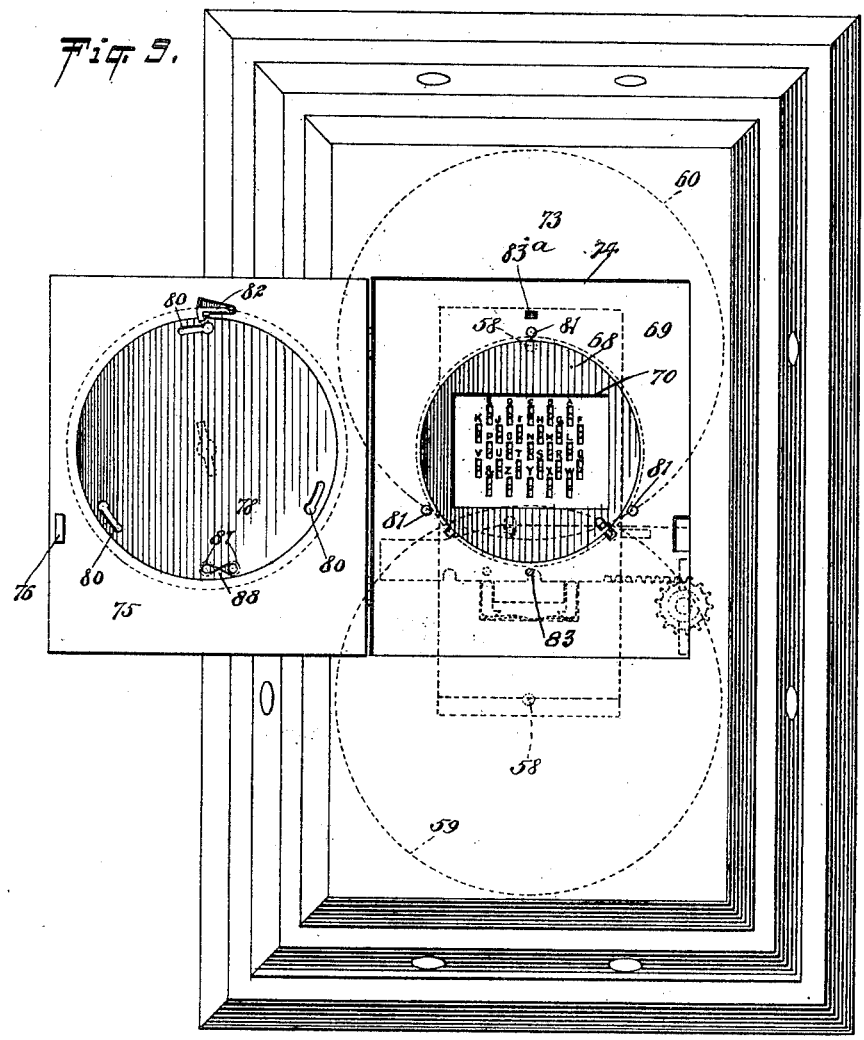
Figure 22:
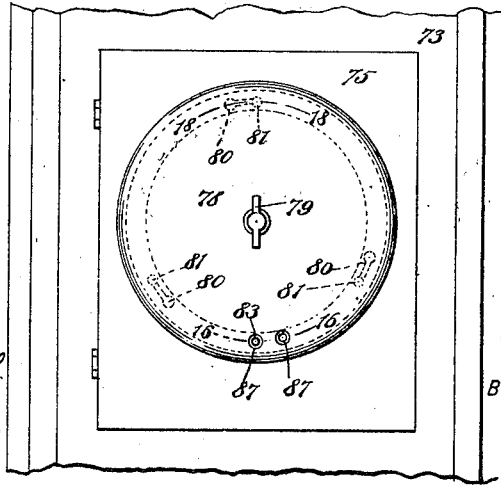

Figure 1 is a front view of the invention as applied to a safe-door, to which purpose the invention is especially applicable. Fig. 2 is a vertical section of the same. Fig. 3 is an enlarged section illustrating the keys, the tumblers, the lock-plates, and their coacting parts. Fig. 4 is a similar view of the parts in a different position. Fig. 5 is an enlarged front view of the finger-keys. Fig. 6 is a rear view of the block in which the finger-keys are mounted with the hereinafter-described retaining-plate removed. Fig. 7 is a sectional perspective of the mechanism shown in Figs. 3 and 4. Fig. 8 is a rear perspective view of the safe-door with the lock mechanism removed. Fig. 9 is a rear elevation of the safe-door, showing the tumblers exposed, permitting the combination to be reset. Fig. 10 is a detail view of the lock-plate and of the slide that works therewith. Fig. 11 is a view of the same parts in a different position. Fig. 12 is a section on the line 12 12 of Fig. 10. Fig. 13 is a section on the line 13 13 of Fig. 11. Fig. 14 is a detached rear face view of the lock-plate. Fig. 15 is a sectional view on the line 15 15 of Fig. 14. Fig. 16 is a section taken on the curved line 16 16 of Fig. 22. Fig. 17 is a fragmentary view showing a part of the auxiliary door at the inner side of the safe-door. Fig. 18 is a detail section on the line 18 18 of Fig. 22. Fig. 19 is a detail showing means for holding the hereinafter-described closure-block in place at the inside of the door. Fig. 20 is a side view of one of the tumblers. Fig. 21 is a top view of one of the tumblers. Fig. 22 is a view of the door at the rear of the lock mechanism, said view showing the door closed. Fig. 23 is a sectional view on the line 23 23 of Fig. 2, excepting that the lock is shown applied to double doors of a safe. Fig. 24 is a perspective view of the plate employed for securing the finger-keys in place. Fig. 25 is a rear elevation of one of the plates in which the bolts are carried. Fig. 26 is a section on the line 26 26 of Fig. 25. Fig. 27 is a section on the line 27 27 of Fig. 25. Fig. 28 is a rear elevation of the plate which is situated immediately rearward of that shown in Fig. 25. Fig. 29 is a section on the line 29 29 of Fig. 28. Figs. 30, 31, and 32 are sectional views showing a modification, the views representing the parts in three successive operations; and Figs. 33, 34, and 35 are rear elevations of the parts shown in Figs. 30, 31, and 32 and showing the successive positions shown in said Figs. 30, 31, and 32.

Assuming that the invention be applied to fireproof safes, as here shown, the door of the safe is formed with a cavity 24 therein, the cavity opening at the back of the door. Secured in this cavity and bearing against the front wall of the door is a block 25, formed with a number of passages 26 therein, these passages registering with passages 27, formed in the front of the door and receiving the finger-keys 28, by means of which the lock is operated. The passages 27 are countersunk at their outer ends, so that the outer ends of the keys 28 may terminate flush with the outer surface of the door and yet be easily operated by inserting one's fingers into the countersunk portions of the passages 27. The passages 26 are counterbored at their inner ends to receive the heads 29 of the finger-keys, such heads having feathers formed thereon, which slide in keyways formed in the block 25 to prevent the rotation of the keys 28. The keys 28 are here shown as being twenty-seven in number, but this may be varied at will, and are respectively designated by the letters of the alphabet or other characters, if desired. Fastened in the cavity 24 of the door and against the inner face of the block 25 is a plate 30. This plate 30 has an opening therein slightly smaller than the block 25, and in this opening is set a plate 31, (see Fig. 24,) the plate 31 being fastened to the block 25 and forming a part thereof. This plate 31 lies over the counterbores of the passages 26 in the block 25 in the manner best shown in Figs. 2, 3, 4, and 7. The plate 31 has an orifice therein for each passage 26 of the block 25, and the plate 31 has nipples or bosses $31^a$ formed thereon respectively at the said orifices, such bosses projecting into the counterbores of the passages 26, as shown, to limit the inward movement of the keys 28 and also to prevent the keys from being driven inward to smash the tumbler mechanism, which will be hereinafter described. For the purpose of maintaining the keys 28 in their outward position I provide expansive spiral springs 41, which encircle the bosses $31^a$ and bear between the keys 28 and plate 31. The space surrounding the block 25 and between the front wall of the door and the plate 30 is filled in with the usual fireproof filling.

Two additional plates 32 and 33 (see Figs. 25 to 29) are secured in the cavity 24 at the rear of the plate 30. The plate 32 is formed with a longitudinally-disposed recess $32^a$, formed at its intermediate portion with a counter-recess $32^b$. In this recess $32^a$ is mounted the vertically-sliding lock-plate 34, which has an intermediately-situated offset $34^a$, (see Figs. 2 and 15,) situated in the counter-recess $32^b$. The front face of the plate 33 is plane and bears true against the plates 32 and 34. The plates 32, 33, and 34 at points respectively alined with the passages 26 of the block 25 are provided with a number of vertically-disposed slots. The slots in the plate 32 are designated 35. In the plate 33 the slots are designated 37, and in the lock-plate 34 the slots are designated 36. These slots 35, 36, and 37 carry the tumblers. (See Figs. 2, 3, 4, 7, 20, and 21.) The tumblers are duplicates in construction and comprise each two oppositely-projected fingers 38, a downwardly-projected ward 39, and an upwardly-projected ward 40, the ward 40 being approximately of one-half the width of the ward 39. The tumblers are arranged as shown in the figures referred to, and each has its front finger 38 projected loosely through the orifices and bosses $31^a$ of the plate 31 and engaged with the corresponding head 29 of the finger-key 28. The inner fingers 38 of the tumblers project loosely through a retaining-plate 42, which is fastened onto the closure-block 44 and forms, essentially, a part thereof, the plate 42 serving to hold in place certain parts which are carried on the closure-block 44 and which will hereinafter be described. Beyond the plate 42 the inner fingers of the tumblers project into cavities 43, formed in the closure-block 44, which is set into the heavy door-plate 45 of the door, such plate 45 being in turn set into the inner portion of the cavity 24 of the door. The cavities 43 are provided with expansive springs 46, which press follower-blocks 47, the follower-blocks in turn engaging the respective inner fingers of the tumblers, serving to push the tumblers forwardly against the plate 31, so that the outer fingers 38 of the tumblers will be in position to be engaged by the finger-keys 28. The tumblers stand vertically in the plates 32, 33, and 34, and certain of these tumblers when set to the combination serve normally to hold the lock-plate 34 raised in the position shown in Figs. 2 and 3. It will be seen that the upper ward 40 of each tumbler is located out of the vertical center of the tumblers, and the tumblers are thus constructed so that they may be reversed in their position with respect to the plates 32, 33, and 34. The combination of the lock is supposed to be made up of a number of letters. This combination may be composed of any number of characters not exceeding the number of fingers on a person's hands. The tumbler of each letter of the combination is arranged in the plates 32, 33, and 34 reversibly with respect to the other tumblers.

Referring now to Figs. 2, 3, and 4, let it be assumed that the upper tumbler and the lower tumbler are members of the combination and that the middle tumbler is not involved in the combination. The upper and lower tumblers therefore are arranged with their wards 40 inward or at the right, and the middle tumbler is arranged with its ward 40 outward or at the left. Referring now to Fig. 3, it will be seen that the plate 34 is supported by the wards 40 of the upper and lower tumblers. Therefore should these tumblers be pushed inward or to the right of said figure the plate will drop, as shown in Fig. 4. It will also be seen that the ward 40 of the middle tumbler in Fig. 3 lies at the front of the plate 34, and should this middle tumbler be pushed inward or to the right the ward 40 thereof will pass into the slot 36 of the plate 34 and prevent the fall thereof. Now it may be understood that should all of the tumblers which compose the combination be simultaneously pushed inward or to the right the plate 34 will drop; but it is clear that these tumblers composing the combination must all be pushed at once and that no other tumbler must be pushed with them. The tumblers are pushed in through the medium of the finger-pieces 28, and the operator knowing the combination places his fingers upon the appropriate keys 28, thus moving the tumblers inward and permitting the lock-plate 34 to drop.

The lock-plate 34 is formed with a transverse groove 48 in its rear face at the offset 34$^a$, such groove 48 having an inclined or cam-shaped upper edge. (See Fig. 14.) The plate 32 is formed with a groove 49, which extends across the cavity 32$^a$ 32$^b$ of the plate 32 (see Figs. 25, 26, and 27) and registers with the groove 48 in the lock-plate 34. These grooves 48 and 49 carry a slide 50, (see Figs. 10 and 11,) which has a rack 51 formed thereon, the rack meshing with a pinion 52, mounted in a cavity 52$^a$ on the plate 32 and operated by means of a handle 53, located on the outside of the door. (See Fig. 1.) By means of this handle 53 the pinion 52 may be turned and the slide 50 thrown back and forth between the positions shown in Figs. 10 and 11. The upper edge of the slide 50 is formed with an inclined or cam-shaped portion 54, which is adapted to work with the inclined upper edge of the groove 48 in the plate 34, so that when the lock-plate drops to the position shown in Fig. 7 and the slide 50 is thrown from the position shown in Fig. 10 to that shown in Fig. 11 the plate 34 will be raised from the position shown in Fig. 7 to its uppermost position, as illustrated in Fig. 11. The lock-plate 34 is further provided with a U-shaped groove 55, communicating with the groove 48 and carrying two dogs 56, pressed upward by a bow-spring 57. Mounted on axes 58, which bear in the plates 33 and 45, are two wheels 59 and 60. The plate 33 is formed at each corner with a rearwardly-disposed enlargement 33$^a$, (see Figs. 28 and 29,) the enlargements having arc-shaped inner edges conforming to but not coming in contact with the peripheries of wheels 59 and 60. The plate 45 bears against the enlargements 33$^a$ of the plate 33, which enlargements slightly exceed in thickness the wheels 59 and 60, allowing sufficient space between the plates 33 and 45 for the free action of said wheels. The wheels 59 and 60 have intersecting peripheries, (see Figs. 2 and 23,) the thickness of the rims of the wheels being reduced at the intersecting points to permit the main portions of the wheels to lie in the same plane and also to allow them to turn slightly to throw the bolts. The wheels 59 and 60 are connected with the slide 50, so as to be moved thereby, by means of the pin 61, attached to the slide and projecting through a slot 33$^b$ in the plate 33 and engaging the wheels 59 and 60 by means of radially-elongated slots formed in said wheels. Therefore the movement of the slide 50 will cause the wheels 59 60 to turn slightly on their axes. The wheels 59 60 have tangentially-disposed slots 62 formed therein, such slots receiving pins 63, fastened to the flat plate-like heads 64 of the bolts 66 of the lock, which heads 64 slide in cavities 65, formed in the plate 33. The bolts 66 are held to slide in the main body of the door, and their inner ends are mounted to slide in grooves 32$^c$, formed in the plate 32. As may be understood from Figs. 2 and 25 to 29, the plate 33 bears against the plate 32, causing the openings 65 of the former to register with the grooves 32$^c$ of the latter. Each bolt at the side of the door is provided with an independent head 64; but the top bolts (being two in number) are provided with a head 64 common to both, and consequently the top opening 65 reaches over both of the top grooves 32°. The arrangement of the bottom bolts is the same.

When the slide 50 is thrown, the wheels 59 and 60 are turned through the medium of the pin 61, and these wheels, through the medium of the slots 62 and pins 63, move the heads 64 in the cavities 65 and throw the bolts 66. The dogs 56 when thrown upward by the spring 57, as shown in Fig. 10, enter recesses 67, formed in the slide 50, and hold the slide against movement. When the plate 34 drops as the tumblers are pushed in, it carries with it the dogs 56 and disengages the dogs from the recesses in the slide 50. This permits the slide to be thrown to the position shown in Fig. 11, which serves not only to raise the lock-plate, and thus reset the tumblers, but also to throw the wheels 59 and 60 and to draw the bolts 66; but it will be observed that when the parts are in this position the dogs 56 are not engaged in the recesses 67, and therefore that the slide 50 is still free to return. When the finger-keys 28 are pushed in, the springs 41 immediately act to return the keys to their outward position, thus preventing persons from detecting the combination. The tumblers which were pressed in by the keys 28 to permit the lock-plate 34 to drop are held at their inner position during the time such plate is lowered by reason of said lock-plate dropping in front of the upwardly-projecting wards of said tumblers, and the tumblers remain in such inner position against the tension of the springs 46 until the plate 34 is moved up. Then the tumblers affected are automatically pushed out by the springs 46 and the upwardly-projecting wards of the tumblers enter the slots 36 of the plate 34 to hold the same in its raised position. The normal or locked position of the parts, therefore, is that shown in Figs. 2, 3, and 10. The operator knowing the combination pushes in the proper keys and the combination-tumblers are thrown inward, permitting the plate 34 to drop, as shown in Fig. 7. This releases the dogs 56 from their engagement with the slide 50 and permits the slide to be moved to turn the wheels 59 60 and withdraw the bolts, the movement of the slide simultaneously returning the plate 34 and the tumblers to their normal position, it being understood that the finger-keys 28 return immediately after being released by the operator. Referring to Fig. 23, it will be seen that the wheel 60 has its lower portion formed with an enlarged orifice 60ᵃ in its web. As the retaining-plate 42 of the closure-block 44 lies in the same plane as the wheels 59 and 60 when the parts are assembled (see Figs. 2, 3, and 4) it will be understood that the purpose of the orifice 60ᵃ, which is of the proper size and form, is to permit the necessary movement of the wheel 60.

The closure-block 44 is held removably in the heavy back plate 45 of the door by means of a disk 68, which is mounted to turn in a plate 69, fastened to and forming part of the plate 45 and located directly rearward of the same. This disk 68 has a rectangular opening 70 formed therein, such opening corresponding with the size of the block 44. (See full and dotted lines in Fig. 19.) To hold the block 44 in place, the disk 68 should be moved to throw the opening 70 thereof vertically, as shown in Fig. 19, and to permit the removal of the block 44 the disk 68 should be moved a quarter-turn, thus causing the walls of the opening 70 to coincide with the side edges of the block 44 and permitting the withdrawal of the block. The retaining-plate 42 being attached to the block 44, this retaining-plate is drawn out with the block, thus exposing the plate 33 and the tumblers, permitting the tumblers to be removed and adjusted to reset the combination, as will be fully described hereinafter. As shown in Figs. 9, 23, and 28, the plate 33 is provided with characters designating the slots therein in conformity with the arrangement of characters on the finger-keys to facilitate changing the combination. The disk 68 is provided with a small bolt 71, which is capable of working with either one of two keepers 72, formed in the plate 69, whereby to hold the disk 68 in the desired position. The innermost plate 73 is fastened to the plates 69 and 45, such parts all forming a rigid structure. This plate 73 has a rectangular opening 74 formed therein. (See Fig. 9.) This opening is normally closed by a door 75, which is hinged to the plate 73 and has its free portion provided with an inwardly-extending staple 76, which is adapted to project through openings formed in the plates 69, 45, and 33, so that the staple 76 may be in the path of a bolt 77, attached to and moving with the slide 50. When the slide 50 is thrown to the position shown in Fig. 10, which is to say the "locked" position, the bolt 77 engages the staple 76 and secures the door 75 in closed position. The door 75 is further held in closed position by means of a circular center piece or disk 78, which is mounted in the door and forms part thereof, the disk being capable of turning in the door and being provided with a handle 79 for facilitating the operation thereof. This disk is provided on its inner face with a number of keyhole-slots 80, respectively worked with headed pins 81, attached to the plate 69. When the door is closed, the heads of the pins 81 enter the enlarged portions of the slots 80, and when the disk 78 is turned the narrowed portions of the slots 80 pass beneath the heads of the pins 81, and thus secure the door 75 in a closed position; but when the disk 78 is turned to the other position the slots in the disk will be in position to release the pins, and the door 75 may be thrown to open position. For the purpose of holding the disk 78 in the position shown in Figs. 9 and 17 I provide a latch 82, which is pivoted in a cavity formed in the door 75 and which when the door is opened drops into a corresponding cavity formed in the disk 78, as shown in Figs. 9 and 17, thus preventing movement of the disk 78; but when the door is closed the latch 82 engages a detent 83ª, attached to the plate 69, thus throwing up the latch 82 and releasing the disk 78. Now in order to prevent the turning of the disk 78 to release the headed pins 81 from the slots 80 I provide a pin 83, which is mounted to move in a horizontally-extended passage 84, formed in the plate 45 and which has a collar 85, against which presses a spring 86, the spring tending to throw the pin toward the disk 78 and the pin projecting through the plate 69, as shown. The disk 78 is formed with two openings 87 therein, such openings being countersunk at their outer ends to allow for the movement of one's fingers when pushing in the pin 83. The inner side of the disk is provided with cavities 88, having inclined walls leading, respectively, to the openings 87, so that when the pin 83 is pushed in and while the disk 78 is being turned the end of said pin, through the medium of the spring 86, will first press against the inwardly-inclined wall of said cavities and thence against the outwardly-inclined wall, and, finally, when the opening 87 comes opposite the pin said pin will slip automatically into said opening. It is arranged, however, that the pin 83 cannot be moved in except when the parts are in a locked position. (See Figs. 2 and 3.) The pin projects through a concentric slot in the web of the wheel 59 and through an opening 89 in the plate 33. The slide 50 is formed with an opening 90 therein which registers with opening 89 when the slide 50 is in locked position, and the lock-plate 34 has an opening 91 therein which registers with the openings 89 and 90 when the lock-plate and slide are in locked position. Therefore it will be seen that the pin 83 cannot be pushed in to release the disk 78 until the parts 34 and 50 are in locked position. The purpose of the parts 68 and 75 is to permit the removal of the block 44 for the purpose of changing the combination, and when such is desired the bolts must first be thrown outwardly or to the locked position. Then the operator may press in the pin 83 and turn the disk 78, thus causing one of the openings 87 to become disengaged from said pin 83, and when the other opening 87 comes opposite the pin 83 said pin will automatically slip into the opening, when the disk 78 will be in the necessary position for the enlarged end of the keyhole-slot 80 in said disk to become disengaged from the headed pins 81; but as the bolts are still in the locked position the staple or keeper 76 is also still engaged by the bolt 77 of the slide 50, and therefore the door 75 cannot be opened until the bolts are thrown back again to the unlocked position, (which of course necessitates the pushing of the proper finger-keys,) when the bolt 77 of the slide 50 will release the staple 76 and the door 75 will then be free to open. Finally, the disk 68 should be turned from the position shown in Fig. 19 to that shown in Fig. 9, thus permitting the block 44, with its attached plate 42, to be withdrawn from the plate 45. This exposes the tumblers and permits the operator to adjust them and to change the combination in any desired manner.

The invention may be applied either to double or single doors, as desired. In Figs. 1, 8, and 9 it is shown on a single door; but in Fig. 23 I have shown it on a double door. When so arranged, it is only necessary to provide one lock proper, as shown at the left of Fig. 23. At the right of such figure or at the other door of the same I only provide bolts 66ª, which are operated by wheels 60ᵇ and 59ª, such wheels being in turn driven by means similar to those before described. The bolts 66 and 66ª at the meeting edges of the two doors abut against each other, as shown in the drawings, and the slots 62ª of the wheels 59ª and 60ᵇ are so arranged that the bolts 66ª at the meeting edges of the second door are shot outward when the other bolts 66ª are withdrawn. Since the bolts 66 and 66ª at the meeting edges of the doors abut against each other and since the bolts 66ª at the meeting edge move outward as the other bolts 66ª move inward, it will be understood that the bolts 66ª cannot be operated until the bolts 66 are withdrawn, which of course cannot take place until the lock at the left of Fig. 25 is operated. Therefore in using the invention as arranged in Fig. 23 the door at the right of such view is first closed and its bolts shot. Then the door at the left is closed and its bolts shot in the manner previously described. The bolts 66 will now act to prevent the withdrawal of the bolt 66ª, and in opening the safe the left-hand door (see Fig. 23) must be first opened and then the right-hand door may be opened.

If desired, two sets of tumblers may be employed, thus enabling two separate combinations to be used. This arrangement and the operations thereof are shown in Figs. 30 to 35. Two complete sets of finger-keys are employed, (which keys, being duplicates of those in the other figures, are not shown.) These keys are arranged to work with the corresponding tumblers. The plates 32, 33, and 34 are of the construction hereinbefore described, except that they are provided with an increased number of orifices to accommodate the increased number of tumblers, such orifices being divided into two equal groups and arranged, respectively, above and below the slide 50, and the blocks 25 and 44, with their plates 31 and 42, are duplicated for the same purpose. The disk 68 is duplicated also; but a single door 75 is provided, which door is enlarged to accommodate the duplicate disks; otherwise these parts are of the same construction as in the single-combination form of my invention. The tumblers 96 and 97 of the double-combination form are constructed as hereinbefore described; but the two sets of tumblers in Figs. 30 to 35 vary in the length of their upper wards. The upper wards of the tumblers 96 are short and those of the tumblers 97 are long. The orifices 35, 36, and 37 of each group are constructed of such size as to permit the tumblers 96 and 97 to be freely interchanged from one orifice to another and from one group to the other. In setting the two combinations one is composed of certain of the tumblers 96 and the other of certain of the tumblers 97. Each combination may have some of its elements in one group of tumblers and some in another, or, if desired, each combination may be placed exclusively in one group. In the drawings, Figs. 30 to 32, I have shown elements of both combinations in each group. When in locked position, the lock-plate 34 is sustained by the upper wards of the tumblers 97, (see Fig. 30,) and in operating the two-combination form of the invention the tumblers 97 are operated first, permitting the lock-plate 34 to fall to the position shown in Fig. 31, in which it rests upon the upper wards of the tumblers 96. Then the tumblers 96 are operated, permitting the lock-plate 34 to continue its fall to the lowermost position. (See Fig. 32.) To insure the prompt action of the lock-plate, a spring 98 may be employed. (See Figs. 33 to 35.) Figs. 33, 34, and 35 show in rear elevation the three positions of the lock-plate and of its dogs 56. It will be observed that the base of the groove 55 is constructed deeper than in the single-combination form to permit the increased relative movement between the lock-plate and dogs. It will also be observed that the first fall of the lock-plate, Fig. 34, serves to partly disengage the dogs 56 from the recesses 67 and that the second and last fall of the lock-plate, Fig. 35, serves to complete this disengagement; otherwise the operation of the parts is the same as that of the single-combination form.

It will be observed that when my invention is applied to a safe-door, as here shown, all the parts of the lock are incased in the door. No parts are exposed except the door 75 and the finger-keys 28. By countersinking the passages 27 the keys 28 are made to terminate flush with the front surface of the door, and yet it is possible to readily push the keys in, as illustrated best in Fig. 7. In Fig. 2 I have indicated at 95 portions of the body of the safe, from which it will be seen that should force be applied to the finger-keys 28 to drive them in this force will be transmitted to the several plates 31, 32, 33, 45, 69, and 73 and by these to the body of the safe. Thereby I attain the greatest possible resisting strength for the structure and render it impossible to force an entrance into the safe without smashing the entire fabric of the door.

Having thus described my invention, I claim as new and desire to secure by Letters Patent—

1. In a permutation-lock, the combination of finger-keys, tumblers actuated thereby, a lock-plate sustained by the tumblers, a slide controlled by the lock-plate and a bolt having connection with the slide to be actuated therefrom.

2. In a permutation-lock, the combination of finger-keys, tumblers actuated thereby, a lock-plate held by the tumblers, a slide controlled by the lock-plate, and a bolt actuated by the slide.

3. In a permutation-lock, the combination of finger-keys, tumblers actuated thereby, a lock-plate sustained in locked position by the tumblers, a bolt, and means for throwing the same such means being released by the fall of the lock-plate.

4. In a lock for safe-doors, the combination with a door having a cavity therein, of a block mounted in the cavity, finger-keys mounted to move in the block and in the front wall of the door, plates mounted rigidly in the cavity of the door rearward of the block and having slots therein registering with the finger-keys, a vertically-sliding lock-plate mounted between the rigid plates, tumblers mounted in the slots of the rigid plates and working with the lock-plate, the tumblers being actuated by the finger-keys, and bolt mechanism controlled by the lock-plate.

5. In a lock for safe-doors, the combination with the door having a cavity formed therein and opening at the rear thereof, of a block mounted in the cavity and bearing against the front wall of the door, finger-keys mounted to move in the block and in the front wall of the door, a number of rigid plates mounted in the cavity rearward of the block and having slots registering with the finger-keys, a lock-plate mounted to move vertically between the rigid plates, tumblers mounted in the slots of the rigid plates and coacting with the lock-plate, the tumblers being actuated from the finger-keys, a slide controlled by the lock-plate, and bolt mechanism actuated by the slide.

6. In a lock, the combination of an actuated lock-plate, a spring-pressed dog carried thereon, a slide mounted to move relatively to the lock-plate and normally held by the dog, the movement of the lock-plate releasing the dog from the slide, and bolt mechanism having connection with the slide to be actuated thereby.

7. In a lock, the combination of an actuated sliding lock-plate having a groove in the face thereof, a slide movable through the groove, a spring-pressed dog carried by the lock-plate and engaging the slide to hold the same, and bolt mechanism having connection with the slide.

8. In a lock, the combination of a lock-plate, means for holding the lock-plate and for permitting the same to drop, a slide movable relatively to the lock-plate, a dog carried by the lock-plate and engaging the slide to hold the same, and bolt mechanism having connection with the slide.

9. In a lock, the combination of an actuated lock-plate, a slide movable relatively thereto and held thereby when the lock-plate is in a certain position, the lock-plate moving from said position to release the slide, and bolt mechanism having connection with the slide.

10. In a permutation-lock, the combination of a vertically-movable lock-plate, tumblers normally sustaining the same, means for actuating the tumblers to release the lock-plate, a slide movable relatively to the lock-plate, the slide being held by the lock-plate when the lock-plate is in raised position, and bolt mechanism having connection with the slide.

11. In a lock, the combination of a bolt, a swinging member having a tangential slot therein, the slot receiving a portion of the bolt to impart movement to the bolt, a slide having a pin engaging said member to move the same, and a pinion meshing with rack-teeth on the slide, whereby to drive the slide.

12. The combination with two doors closing the one against the other, of bolts mounted in each door, the meeting edges of the doors having each a bolt, which bolts oppose each other, and the bolts of the first door being arranged so that the bolt at the meeting edge thereof will move outward when the other bolts of the said first door move inward, means for operating the bolts of the said first door, and permutation-lock mechanism for operating the bolts of the second door.

13. The combination with a door having permutation-lock mechanism inclosed therein, of a block serving to cover such mechanism and removably seated in a rear portion of the door, and an orificed disk mounted to turn in the rear portion of the door, the disk in one position serving to hold the block and in the other position serving to permit the removal thereof.

14. The combination with a door having permutation-lock mechanism inclosed therein, of a member removably seated in a rear portion of the door and serving to cover the lock mechanism, and a locking disk or member mounted to turn in the rear portion of the door and serving to removably hold the first-named member in place.

15. The combination with a main portion or support, of a door mounted thereon, a disk mounted to turn on the door and having a keyhole-slot therein, and a headed pin carried by the main portion or support and engaging in the keyhole-slot to hold the door in closed position until the disk is turned to disengage the pin from the walls of the keyhole-slot.

16. The combination with a door having lock mechanism inclosed therein, of an auxiliary door mounted on the main door and covering the lock mechanism, a disk mounted to turn in the auxiliary door and having a keyhole-slot therein, and a headed pin carried on the main door and engaging the walls of the keyhole-slot to hold the auxiliary door closed.

17. The combination with a door having permutation-lock mechanism inclosed therein, of an auxiliary door mounted on the main door, a disk mounted to turn on the auxiliary door, a pin carried by the main door and engaged by the disk, the pin serving to hold the auxiliary door closed, the disk being capable of disengaging the pin by a turning movement of the disk, and a spring-pressed pin carried in the main door and removably engaging the disk to prevent the turning thereof, the said spring-pressed pin coacting with parts of the permutation-lock, thus preventing the releasing movement of said pin except when the lock is in a certain predetermined position.

18. The combination with a main portion or support, of a door mounted thereon, a member mounted to turn in the door, a latch pivotally mounted on the door and engaging the member to hold the same, and a cam-shaped detent mounted on the main portion or support and engaged by the latch when the door is thrown to closed position, whereby to move the latch from engagement with the disk.

19. The combination with a door having permutation-lock mechanism contained therein, of an auxiliary door mounted on the main door, and means for holding the auxiliary door closed, such means being controlled by the lock mechanism and being releasable only when the lock mechanism is in a certain predetermined position.

20. The combination with a door having permutation-lock mechanism contained therein, of an auxiliary door mounted on the main door, and two independently-operative devices for holding the auxiliary door closed, such devices coacting with the lock mechanism and each being operative only when the lock mechanism is in a certain predetermined position, the one of such auxiliary-door-holding devices being operative during the time that the other of such devices is inoperative.

21. The combination with a door having countersunk passages in the front walls thereof, of permutation-lock mechanism contained in the door, and finger-keys mounted in the passages of the door to actuate the lock mechanism, the finger-keys normally lying flush with the front surface of the door.

22. A permutation-lock, having tumblers each having two wards respectively projecting upward and downward, the upper ward being of a width reduced over that of the lower ward, and the lower ward being longer than the upper ward, and the tumblers also having two oppositely-projected fingers extending from the tumblers at the juncture of the wards thereof.

23. A permutation-lock having a tumbler constructed with two wards respectively projected upward and downward, the edges of the ward at one side of the tumbler being in alinement with each other, and the upper ward being of a width reduced over that of the lower ward, and the tumbler having two oppositely-projected fingers extending from the tumbler at the juncture of the wards thereof.

24. In a permutation-lock, the combination with a bolt and mechanism connected therewith for throwing the same, of means serving to control said mechanism for throwing the bolt, tumblers controlling said means, each tumbler having two wards respectively projected upward and downward, the upper ward being of a width reduced over that of the lower ward, and the lower ward being longer than the upper ward, and the tumblers having oppositely-projected fingers extended therefrom at the juncture of the wards, thus permitting the reversal of the tumblers, for the purpose specified, and finger-keys for actuating the tumblers.

25. A permutation-lock, the combination with bolt-actuating mechanism, of tumblers controlling such mechanism, each tumbler having its end portions formed alike to permit the reversal of the tumblers, finger-keys respectively arranged end to end with the tumblers reciprocal to actuate the same.

26. The combination with a door having lock mechanism, of an auxiliary door mounted on the main door to cover the lock mechanism, and means for holding the auxiliary door closed, such means being controlled by the lock mechanism.

27. In a permutation-lock, the combination of a lock-plate, tumblers controlling the lock-plate, a bolt, and means for throwing the bolt, such means being controlled by the lock-plate.

28. In a permutation-lock, the combination of tumblers, a lock-plate controlled by the tumblers, a bolt, and means for throwing the bolt, such means comprising a sliding member imparting movement to the bolt, the movement of the sliding member being controlled by the lock-plate.

29. In a permutation-lock, the combination of tumblers, a lock-plate controlled thereby, a bolt, and means for throwing the bolt, such means comprising relatively movable parts through which is transmitted the movement to throw the bolt, one of the parts being controlled by the lock-plate.

WILLIAM BEEBE.

Witnesses:
ISAAC B. OWENS,
JNO. M. RITTER.